United States Patent
Ando et al.

(10) Patent No.: US 9,975,418 B2
(45) Date of Patent: May 22, 2018

(54) HYBRID VEHICLE AND METHOD OF CONTROLLING HYBRID VEHICLE

(71) Applicant: Toyota Jidosha Kabushiki Kaisha, Toyota-shi, Aichi-ken (JP)

(72) Inventors: Takashi Ando, Nisshin (JP); Yu Shimizu, Nagakute (JP); Takeshi Kishimoto, Nagakute (JP); Masaya Amano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 64 days.

(21) Appl. No.: 15/278,356

(22) Filed: Sep. 28, 2016

(65) Prior Publication Data

US 2017/0106852 A1 Apr. 20, 2017

(30) Foreign Application Priority Data

Oct. 19, 2015 (JP) ................................. 2015-205740

(51) Int. Cl.
| | |
|---|---|
| *B60W 10/06* | (2006.01) |
| *B60K 6/365* | (2007.10) |
| *B60K 6/445* | (2007.10) |
| *B60W 20/50* | (2016.01) |
| *B60W 10/08* | (2006.01) |

(52) U.S. Cl.
CPC ............ *B60K 6/365* (2013.01); *B60K 6/445* (2013.01); *B60W 20/50* (2013.01); *B60W 10/06* (2013.01); *B60W 10/08* (2013.01); *B60W 2510/0638* (2013.01); *B60W 2520/28* (2013.01); *B60W 2710/0644* (2013.01); *B60W 2710/08* (2013.01); *B60Y 2200/92* (2013.01); *B60Y 2300/61* (2013.01); *B60Y 2400/73* (2013.01); *Y02T 10/6239* (2013.01); *Y02T 10/6286* (2013.01);
(Continued)

(58) Field of Classification Search
None
See application file for complete search history.

(56) References Cited

U.S. PATENT DOCUMENTS

| | | | | |
|---|---|---|---|---|
| 8,140,207 B2* | 3/2012 | Nozaki | ................ | B60W 20/30 |
| | | | | 180/65.21 |
| 8,342,273 B2* | 1/2013 | Takahashi | .............. | B60K 6/365 |
| | | | | 180/65.275 |

(Continued)

FOREIGN PATENT DOCUMENTS

| | | |
|---|---|---|
| JP | 2006304389 A | 11/2006 |
| JP | 2010012827 A | 1/2010 |

(Continued)

*Primary Examiner* — Mussa A Shaawat
*Assistant Examiner* — Abdhesh K Jha
(74) *Attorney, Agent, or Firm* — Dinsmore & Shohl LLP

(57) ABSTRACT

An ECU performs control processing including setting an inverter to a gate blocking state when an abnormal condition of the inverter occurs, activating a converter, driving an engine, carrying out first suppression control when an abnormal condition of a resolver occurs and when an MG2 rotation speed immediately before occurrence of the abnormal condition is equal to or smaller than a first speed threshold value, and carrying out second suppression control when the MG2 rotation speed immediately before occurrence of the abnormal condition is greater than the first speed threshold value and when there is no record of stop.

4 Claims, 10 Drawing Sheets

(52) U.S. Cl.
    CPC .......... *Y10S 903/906* (2013.01); *Y10S 903/91* (2013.01); *Y10S 903/93* (2013.01)

(56) References Cited

U.S. PATENT DOCUMENTS

| | | | | |
|---|---|---|---|---|
| 2009/0243554 A1* | 10/2009 | Gu | ............................ | B60K 6/48 320/162 |
| 2010/0121512 A1* | 5/2010 | Takahashi | .............. | B60K 6/365 701/22 |
| 2015/0280546 A1* | 10/2015 | Kouno | ................... | H02M 1/36 363/132 |

FOREIGN PATENT DOCUMENTS

| | | | |
|---|---|---|---|
| JP | 2010029030 A | 2/2010 |
| JP | 2013017352 A | 1/2013 |
| JP | 2013-203116 A | 10/2013 |

\* cited by examiner

HYBRID VEHICLE AND METHOD OF CONTROLLING HYBRID VEHICLE

CROSS-REFERENCE TO RELATED APPLICATIONS

This application claims priority to Japanese Patent Application No. 2015-205740 filed on Oct. 19, 2015, the entire contents of which are hereby incorporated by reference.

BACKGROUND

Field

The present disclosure relates to control of a hybrid vehicle which can run with motive power from at least one of an engine and a rotating electric machine.

Description of the Background Art

Japanese Patent Laying-Open No. 2013-203116 discloses a hybrid vehicle including an engine, a first rotating electric machine including a permanent magnet in a rotor, an output shaft connected to a wheel (a drive wheel), a planetary gear mechanism, a second rotating electric machine connected to the output shaft, a battery, an inverter which converts power among the battery, the first rotating electric machine, and the second rotating electric machine, and a control device. The planetary gear mechanism includes a sun gear coupled to the first rotating electric machine, a ring gear coupled to the output shaft, and a carrier coupled to the engine. The control device carries out "inverterless running control" in which the vehicle runs with a limp home function while the inverter is set to a gate blocking state and the engine is driven.

During inverterless running control, a counter-electromotive voltage is generated in the first rotating electric machine by dynamically (mechanically) rotating the first rotating electric machine with rotational force of the engine. When a current flows from the first rotating electric machine to the battery with the counter-electromotive voltage, counter-electromotive torque (braking torque) applied in a direction interfering rotation of the first rotating electric machine is generated in the first rotating electric machine. As counter-electromotive torque is applied from the first rotating electric machine to the sun gear, drive torque applied in a positive direction (a forward direction) is generated in the ring gear as reaction force of the counter-electromotive torque of the first rotating electric machine. Drive torque realizes run with a limp home function.

SUMMARY

The counter-electromotive voltage generated by the first rotating electric machine varies in accordance with a rotation speed of the first rotating electric machine. During inverterless running control described above, counter-electromotive torque (that is, drive torque) of the first rotating electric machine varies in accordance with the rotation speed of the first rotating electric machine. Therefore, during inverterless running control, secondary failure due to overheating of the first rotating electric machine or overrevolution of the planetary gear mechanism should be prevented by suppressing the rotation speed of the first rotating electric machine to be within a predetermined rotation speed region.

During inverterless running control, however, for example, when such an abnormal condition that the control device cannot obtain an output value from a resolver which detects a rotation speed of the first rotating electric machine and a resolver which detects a rotation speed of the second rotating electric machine occurs, the control device may not be able to know the rotation speed of the first rotating electric machine. Therefore, such overspeed rotation may occur that the rotation speed of the first rotating electric machine exceeds a limit value of the predetermined rotation speed region.

An object of the present disclosure is to provide a hybrid vehicle in which overspeed rotation of a first rotating electric machine is suppressed during inverterless running control.

A hybrid vehicle according to one aspect of this disclosure includes an engine, a first rotating electric machine, an output shaft, a planetary gear mechanism, a second rotating electric machine, a battery, an inverter, a first sensor, a second sensor, an engine rotation speed sensor, a wheel speed sensor, and a controller. The first rotating electric machine includes a permanent magnet in a rotor. The output shaft is connected to a wheel. The planetary gear mechanism includes a carrier coupled to the engine, a sun gear coupled to the first rotating electric machine, and a ring gear coupled to the output shaft. The second rotating electric machine is connected to the output shaft. The inverter is configured to convert power among the battery, the first rotating electric machine, and the second rotating electric machine. The first sensor is configured to detect a rotation speed and a direction of rotation of the first rotating electric machine. The second sensor is configured to detect a rotation speed and a direction of rotation of the second rotating electric machine. The engine rotation speed sensor is configured to detect a rotation speed of the engine. The wheel speed sensor is configured to detect a rotation speed of the wheel, and it is unable to detect a direction of rotation of the wheel. The controller is configured to carry out inverterless running control when the first rotating electric machine and the second rotating electric machine cannot normally be driven by the inverter. Inverterless running control is control in which the inverter is set to a gate blocking state, the engine is driven to generate in the first rotating electric machine, braking torque originating from a counter-electromotive voltage, and a vehicle runs with torque applied to the output shaft as reaction force of the braking torque. When the controller cannot obtain output values from the first sensor and the second sensor during the inverterless running control, the controller is configured to calculate a first estimated value of a rotation speed of the first rotating electric machine at the time when the wheel is assumed to rotate forward and a second estimated value of a rotation speed of the first rotating electric machine at the time when the wheel is assumed to rotate rearward, by using an output value from the engine rotation speed sensor and an output value from the wheel speed sensor. The controller is configured to control the rotation speed of the engine such that both of the first estimated value and the second estimated value are within a predetermined rotation speed region.

Thus, during inverterless running control, an engine rotation speed is controlled such that both of the first estimated value and the second estimated value are within the predetermined rotation speed region. Therefore, even when an actual value of the rotation speed of the first rotating electric machine is any of the first estimated value and the second estimated value, overspeed rotation of the first rotating electric machine can be suppressed.

Furthermore, when the controller cannot obtain the output values from the first sensor and the second sensor during inverterless running control, the controller is configured to control the rotation speed of the engine such that one of the first estimated value and the second estimated value having the same sign as an output value from the second sensor immediately before an output value from the second sensor cannot be obtained is within the predetermined rotation speed region when there is no stop record of the vehicle in which the output value from the wheel speed sensor attains to a value indicating a stop state during inverterless running control. The controller is configured to control the rotation speed of the engine such that both of the first estimated value and the second estimated value are within the predetermined rotation speed region when there is a stop record of the vehicle.

Thus, when there is no stop record of the vehicle, whether the vehicle runs forward or rearward can be specified based on a sign of an output value from the second sensor immediately before failure in obtaining an output value. Therefore, the rotation speed of the engine is controlled such that an estimated value of the rotation speed of the first rotating electric machine corresponding to a sign of an output value from the second sensor immediately before failure in obtaining an output value is within the predetermined rotation speed region. Overspeed rotation of the first rotating electric machine can thus be suppressed. As compared with an example of control such that both of the first estimated value and the second estimated value are within the predetermined rotation speed region, a degree of restriction of a vehicle speed can be relaxed. When there is a stop record of the vehicle, it is difficult to specify whether the vehicle which resumed running runs forward or rearward. Therefore, overspeed rotation of the first rotating electric machine can reliably be suppressed by controlling a rotation speed of the engine such that both of the first estimated value and the second estimated value are within the predetermined rotation speed region.

The foregoing and other objects, features, aspects and advantages of the present disclosure will become more apparent from the following detailed description of the present disclosure when taken in conjunction with the accompanying drawings.

DETAILED DESCRIPTION

Figure 1:
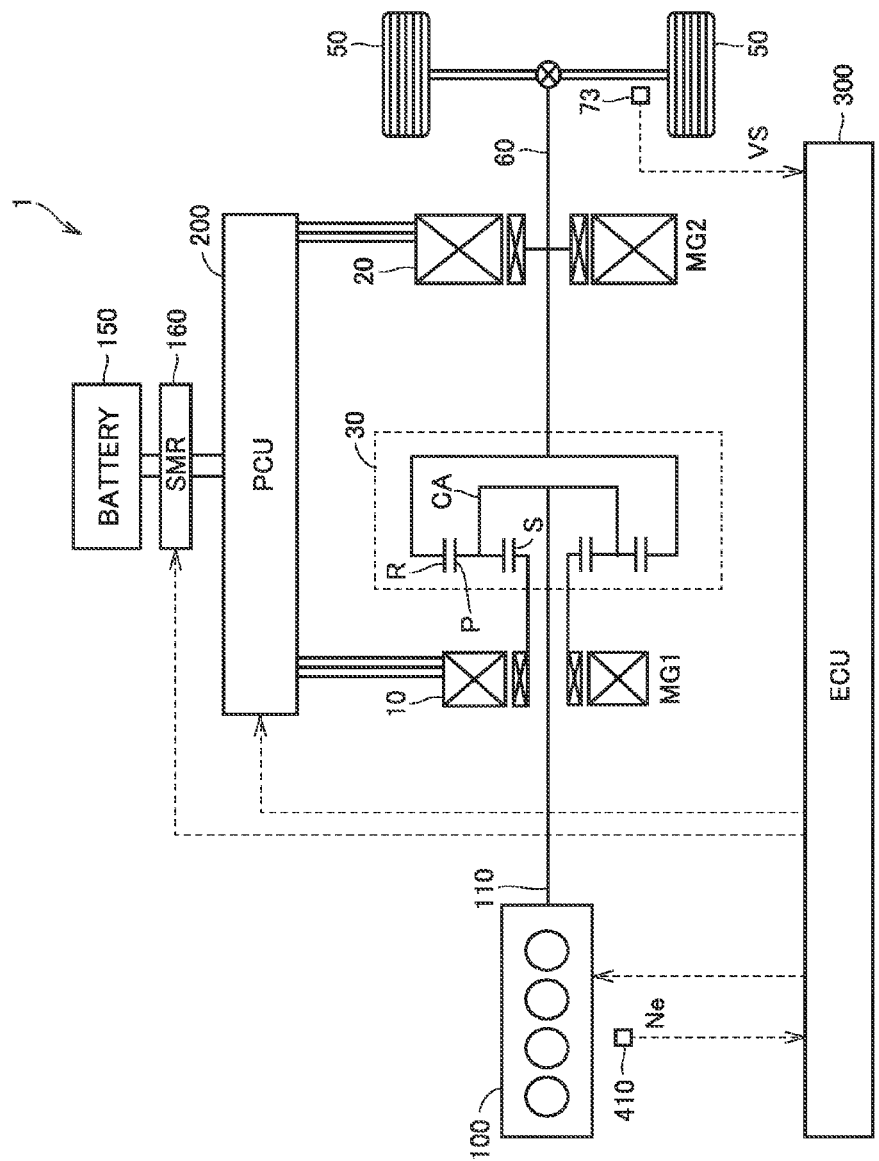
FIG. 1 is a block diagram schematically showing an overall configuration of a vehicle.

An embodiment of the present disclosure will be described hereinafter in detail with reference to the drawings. The same or corresponding elements in the drawings have the same reference characters allotted and description thereof will not be repeated.

<Overall Configuration of Vehicle>

FIG. 1 is a block diagram schematically showing an overall configuration of a hybrid vehicle 1 (hereinafter simply denoted as vehicle 1) according to one or more embodiments. Vehicle 1 includes an engine 100, a motor-generator 10 (hereinafter may be denoted as MG1) representing a first rotating electric machine, a motor-generator 20 (hereinafter may be denoted as MG2) representing a second rotating electric machine, a planetary gear mechanism 30, a drive wheel 50, an output shaft 60 connected to drive wheel 50, a wheel speed sensor 73, a battery 150, a system main relay (SMR) 160, a power control unit (PCU) 200, and an electronic control unit (ECU) 300.

Vehicle 1 runs with motive power from at least one of engine 100 and motor-generator 20. Vehicle 1 can switch a manner of running between electric vehicle running (hereinafter referred to as "EV running") in which the vehicle runs with motive power from motor-generator 20 without using motive power from engine 100 and a hybrid vehicle running (hereinafter referred to as "HV running") in which the vehicle runs with motive power from both of engine 100 and motor-generator 20 during normal running which will be described later.

Engine 100 is an internal combustion engine such as a gasoline engine or a diesel engine. Engine 100 generates motive power for vehicle 1 to run in response to a control signal from ECU 300. Motive power generated by engine 100 is output to planetary gear mechanism 30.

Engine 100 is provided with an engine rotation speed sensor 410. Engine rotation speed sensor 410 detects a rotation speed (an engine rotation speed) Ne of a crankshaft 110 of engine 100 and outputs a signal indicating a result of detection to ECU 300.

Each of motor-generators 10 and 20 is a three-phase alternating current (AC) permanent magnet synchronous motor. Motor-generator 10 rotates crankshaft 110 of engine 100 with electric power from battery 150 in starting engine 100. Motor-generator 10 can also generate power by using motive power from engine 100. AC power generated by motor-generator 10 is converted to direct current (DC) power by PCU 200 and battery 150 is charged with DC power. AC power generated by motor-generator 10 may be supplied to motor-generator 20.

A rotor of motor-generator 20 is coupled to output shaft 60. Motor-generator 20 rotates output shaft 60 with electric power supplied from at least one of battery 150 and motor-generator 10. Motor-generator 20 can also generate power through regenerative braking. AC power generated by motor-generator 20 is converted to DC power by PCU 200 and battery 150 is charged with DC power.

Output shaft 60 is connected to left and right drive wheels 50 with a differential gear being interposed. Drive wheel 50 is provided with wheel speed sensor 73. Wheel speed sensor 73 detects a rotation speed of drive wheel 50 as a wheel speed VS and outputs a signal indicating a result of detection to ECU 300. Though wheel speed sensor 73 can detect magnitude (an absolute value) of a rotation speed of drive wheel 50, it cannot detect a direction of rotation of drive wheel 50. Though ECU 300 can know magnitude (an absolute value) of a rotation speed of drive wheel 50 from an output value from wheel speed sensor 73, it cannot know a direction of rotation of drive wheel 50. Though FIG. 1 shows one wheel speed sensor 73, the number of wheel speed sensors 73 is not limited to one. For example, wheel speed sensor 73 may be provided for each of four wheels (left and right drive wheels 50 and not-shown left and right driven wheels) of vehicle 1.

Planetary gear mechanism 30 is constructed to mechanically couple engine 100, motor-generator 10, and output shaft 60 to one another and to transmit torque among engine 100, motor-generator 10, and output shaft 60. Specifically, planetary gear mechanism 30 includes a sun gear S, a ring gear R, a carrier CA, and a pinion gear P as rotational elements. Sun gear S is coupled to the rotor of motor-generator 10. Ring gear R is coupled to output shaft 60. Pinion gear P is engaged with sun gear S and ring gear R. Carrier CA is coupled to crankshaft 110 of engine 100. Carrier CA holds pinion gear P such that pinion gear P can rotate and revolve.

As planetary gear mechanism 30 is constructed as above, a rotation speed of sun gear S(=MG1 rotation speed Nm1), a rotation speed of carrier CA (=engine rotation speed Ne), and a rotation speed of ring gear R (=MG2 rotation speed Nm2) have such relation as being connected with a straight line in a nomographic chart (such relation that when any two rotation speeds are determined, one remaining rotation speed is determined; hereinafter also referred to as "relation in a nomographic chart"). Since ring gear R is connected to drive wheel 50 with output shaft 60 being interposed, magnitude (an absolute value) of a rotation speed of ring gear R (=MG2 rotation speed Nm2) is in proportion to magnitude (an absolute value) of wheel speed VS.

Battery 150 is a rechargeable lithium ion secondary battery. Battery 150 may be another secondary battery such as a nickel metal hydride secondary battery.

SMR 160 is connected in series in a power line between battery 150 and PCU 200. SMR 160 switches between a conducting state and a disconnected state between battery 150 and PCU 200 in response to a control signal from ECU 300.

PCU 200 boosts DC power stored in battery 150, converts the boosted voltage to an AC voltage, and supplies the resultant AC voltage to motor-generators 10 and 20. PCU 200 converts AC power generated by motor-generators 10 and 20 into DC power and supplies resultant DC power to battery 150. A configuration of PCU 200 will be described in detail with reference to FIG. 2.

Though not shown, ECU 300 includes a central processing unit (CPU), a memory, and an input and output buffer. ECU 300 controls an output from engine 100 (fuel injection, ignition timing, or valve timing) and outputs from motor-generators 10 and 20 (an amount of current feed) such that vehicle 1 achieves a desired running state based on signals from each sensor and devices and a map and a program stored in the memory. Various types of control are not limited to processing by software but can also be processed by dedicated hardware (electronic circuits).

<Configuration of Electric System and ECU>

Figure 2:
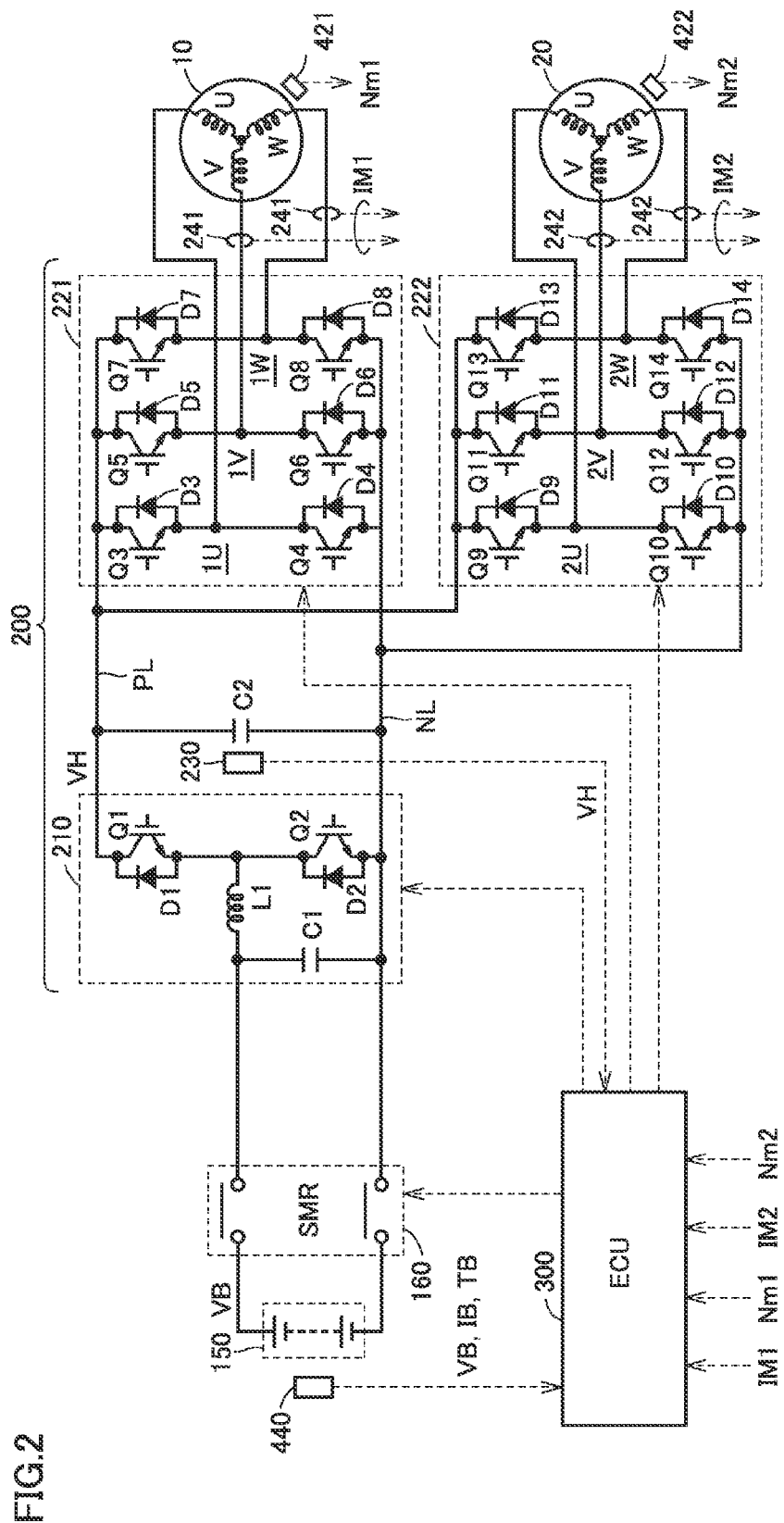
FIG. 2 is a circuit block diagram for illustrating a configuration of an electric system of the vehicle.

FIG. 2 is a circuit block diagram for illustrating a configuration of the electric system of vehicle 1. The electric system of vehicle 1 includes battery 150, SMR 160, PCU 200, motor-generators 10 and 20, and ECU 300. PCU 200 includes a converter 210, a capacitor C2, inverters 221 and 222, and a voltage sensor 230.

A monitoring unit 440 is provided for battery 150. Monitoring unit 440 detects a voltage VB of battery 150 (a battery voltage), a current IB supplied to battery 150 (a battery current), and a temperature TB of battery 150 (a battery temperature), and outputs a signal indicating a result of detection to ECU 300.

Converter 210 includes a capacitor C1, a reactor L1, a switching element Q1 (an upper arm) and a switching element Q2 (a lower arm), and diodes D1 and D2. Capacitor C1 smoothens battery voltage VB and supplies the smoothened voltage to converter 210. Each of switching elements Q1 and Q2 and switching elements Q3 to Q14 which will be described later is, for example, an insulated gate bipolar transistor (IGBT). Switching elements Q1 and Q2 are connected in series to each other between a power line PL and a power line NL. Diodes D1 and D2 are connected in anti-parallel between collectors and emitters of switching elements Q1 and Q2, respectively. Reactor L1 has one end connected to a high potential side of battery 150 and the other end connected to a point intermediate between the upper arm and the lower arm (a point of connection between the emitter of switching element Q1 and the collector of switching element Q2).

Converter 210 boosts battery voltage VB input from battery 150 through a switching operation of the upper arm and the lower arm in response to a control signal from ECU 300 and outputs the boosted battery voltage to power lines PL and NL. Converter 210 down-converts a DC voltage of power lines PL and NL supplied from one or both of inverter 221 and inverter 222 through a switching operation of the upper arm and the lower arm in response to a control signal from ECU 300 and outputs the resultant DC voltage to battery 150.

Capacitor C2 is connected between power line PL and power line NL. Capacitor C2 smoothens a DC voltage supplied from converter 210 and supplies the resultant DC voltage to inverters 221 and 222.

Voltage sensor 230 detects a voltage across opposing ends of capacitor C2, that is, an output voltage (hereinafter also referred to as a "system voltage") VH from converter 210 and outputs a signal indicating a result of detection to ECU 300.

When inverter 221 is supplied with system voltage VH, it converts the DC voltage to an AC voltage in response to a control signal from ECU 300 and drives motor-generator 10. Inverter 221 includes a U-phase arm 1U, a V-phase arm 1V, and a W-phase arm 1W. Arms of these phases are connected in parallel to one another between power line PL and power line NL. U-phase arm 1U includes switching elements Q3 and Q4 connected in series to each other. V-phase arm 1V includes switching elements Q5 and Q6 connected in series to each other. W-phase arm 1W includes switching elements Q7 and Q8 connected in series to each other. Diodes D3 to D8 are connected in anti-parallel between collectors and emitters of switching elements Q3 to Q8, respectively.

Inverter 222 includes phase arms 2U to 2W, switching elements Q9 to Q14, and diodes D9 to D14. Since inverter 222 is basically equivalent in configuration to inverter 221, detailed description thereof will not be repeated.

Motor-generator 10 is provided with a resolver 421 (a first sensor). Resolver 421 detects a rotation speed of motor-generator 10 (an MG1 rotation speed Nm1) and outputs a signal indicating a result of detection to ECU 300. Resolver 421 can detect magnitude (an absolute value) of a rotation speed and a direction of rotation. ECU 300 can know not only magnitude (an absolute value) of a rotation speed of motor-generator 10 but also a direction of rotation from an output value from resolver 421.

Motor-generator 20 is provided with a resolver 422 (a second sensor). Resolver 422 detects a rotation speed of motor-generator 20 (an MG2 rotation speed Nm2) and outputs a signal indicating a result of detection to ECU 300. Similarly to resolver 421, resolver 422 can detect magnitude (an absolute value) of a rotation speed and a direction of rotation. ECU 300 can know not only magnitude (an absolute value) of a rotation speed of motor-generator 20 but also a direction of rotation from an output value from resolver 422.

Motor-generators 10 and 20 are provided with current sensors 241 and 242, respectively. Current sensor 241 detects a current (a motor current) IM1 which flows to motor-generator 10. Current sensor 242 detects a current (a motor current) IM2 which flows to motor-generator 20. These sensors output signals indicating results of detection to ECU 300, respectively.

ECU 300 controls PCU 200 (converter 210 and inverters 221 and 222) based on information from each sensor such that outputs from motor-generators 10 and 20 become desired outputs. Though ECU 300 is configured as one unit in the example shown in FIG. 2, ECU 300 may be divided into a plurality of units.

<Normal Running and Inverterless Running>

ECU 300 can allow vehicle 1 to run in any control mode of a normal mode and a limp home mode.

The normal mode is a mode in which vehicle 1 runs with switching between EV running and HV running described above being made as necessary. In other words, the normal mode is a mode in which electrical drive of motor-generators 10 and 20 by inverters 221 and 222 is allowed. Running in the normal mode is herein denoted as "normal running."

The limp home mode is a mode in which vehicle 1 runs with a limp home function by driving engine 100 while inverters 221 and 222 are set to a gate blocking state when an abnormal condition of the inverter occurs. The abnormal condition of the inverter refers to such an abnormal condition that motor-generators 10 and 20 cannot normally electrically be driven by inverters 221 and 222 due to failure of such a component as current sensors 241 and 242. In other words, the limp home mode is a mode in which electrical drive of motor-generators 10 and 20 by inverters 221 and 222 is not allowed. Running in the limp home mode is herein denoted as "inverterless running" and control for inverterless running is denoted as "inverterless running control."

Figure 3:
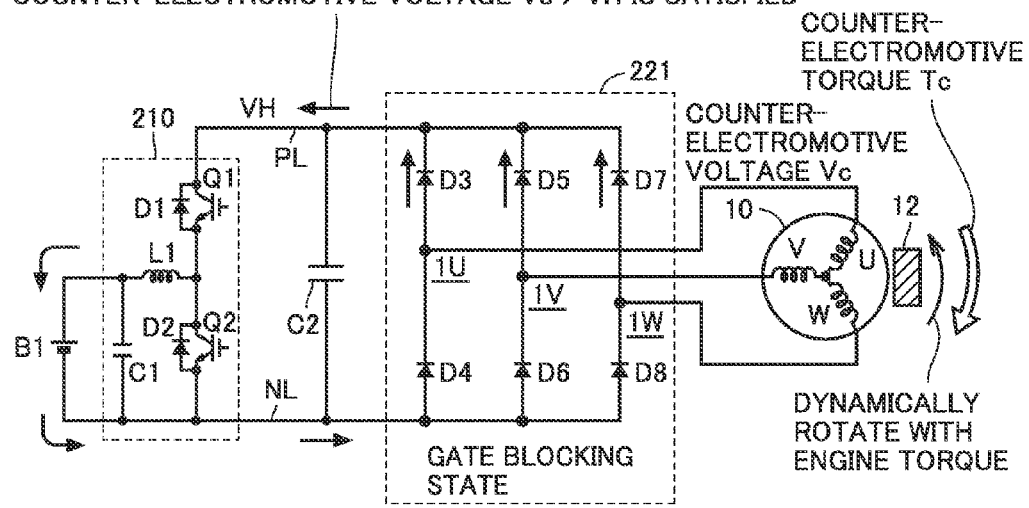
FIG. 3 is a diagram schematically showing a state of the electric system during inverterless running.

FIG. 3 is a diagram schematically showing a state of the electric system during inverterless running. During inverterless running, in response to a control signal from ECU 300, all switching elements Q3 to Q8 included in inverter 221 are set to the gate blocking state (a non-conducting state). Therefore, diodes D3 to D8 included in inverter 221 implement a three-phase full-wave rectifier circuit. Similarly, in response to a control signal from ECU 300, all switching elements Q9 to Q14 (see FIG. 2) included in inverter 222 are set to the gate blocking state (a non-conducting state). Therefore, diodes D9 to D14 included in inverter 222 implement a three-phase full-wave rectifier circuit. In converter 210, a switching operation of switching elements Q1 and Q2 continues in response to a control signal from ECU 300.

During inverterless running, engine 100 is driven and engine torque Te is output from engine 100. Motor-generator 10 dynamically (mechanically) rotates with engine torque Te. Since motor-generator 10 is a synchronous motor, a permanent magnet 12 is provided in a rotor of motor-generator 10. Therefore, as permanent magnet 12 provided in the rotor of motor-generator 10 rotates with engine torque Te, a counter-electromotive voltage Vc is generated in motor-generator 10. When counter-electromotive voltage Vc exceeds system voltage VH, a current flows from motor-generator 10 toward battery 150. In motor-generator 10, counter-electromotive torque Tc (braking torque) applied in a direction interfering rotation of motor-generator 10 is generated.

Figure 4:
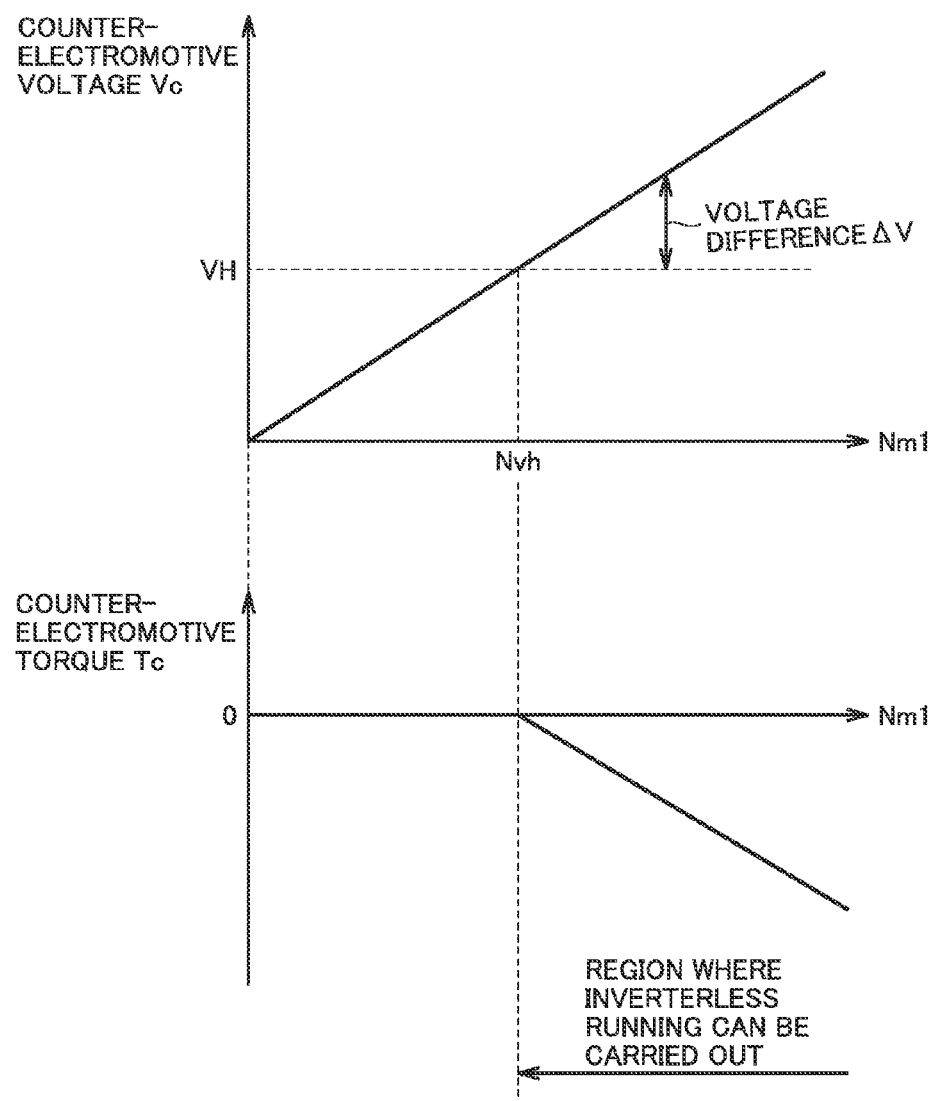
FIG. 4 is a diagram schematically showing correspondence among an MG1 rotation speed Nm1, a counter-electromotive voltage Vc, and counter-electromotive torque Tc.

FIG. 4 is a diagram schematically shows correspondence among MG1 rotation speed Nm1, counter-electromotive voltage Vc, and counter-electromotive torque Tc. In FIG. 4, the abscissa represents MG1 rotation speed Nm1, and the ordinate represents counter-electromotive voltage Vc and counter-electromotive torque Tc from above.

A rotation speed region shown in FIG. 4 has such characteristics that counter-electromotive voltage Vc is higher in value as MG1 rotation speed Nm1 is higher. In a region where MG1 rotation speed Nm1 is lower than a prescribed value Nvh, counter-electromotive voltage Vc is lower than system voltage VH, and hence no current flows from motor-generator 10 toward battery 150. Therefore, counter-electromotive torque Tc is not generated either.

In a region where MG1 rotation speed Nm1 exceeds prescribed value Nvh, counter-electromotive voltage Vc exceeds system voltage VH, and hence a current in accordance with a difference (hereinafter also referred to as a "voltage difference ΔV") between counter-electromotive voltage Vc and system voltage VH flows from motor-generator 10 toward battery 150. Motor-generator 10 generates counter-electromotive force, and battery 150 is charged with this counter-electromotive force. In motor-generator 10, counter-electromotive torque Tc in accordance with voltage difference ΔV is generated. Counter-electromotive torque Tc is braking torque (negative torque) applied in a direction interfering rotation of motor-generator 10.

Figure 5:
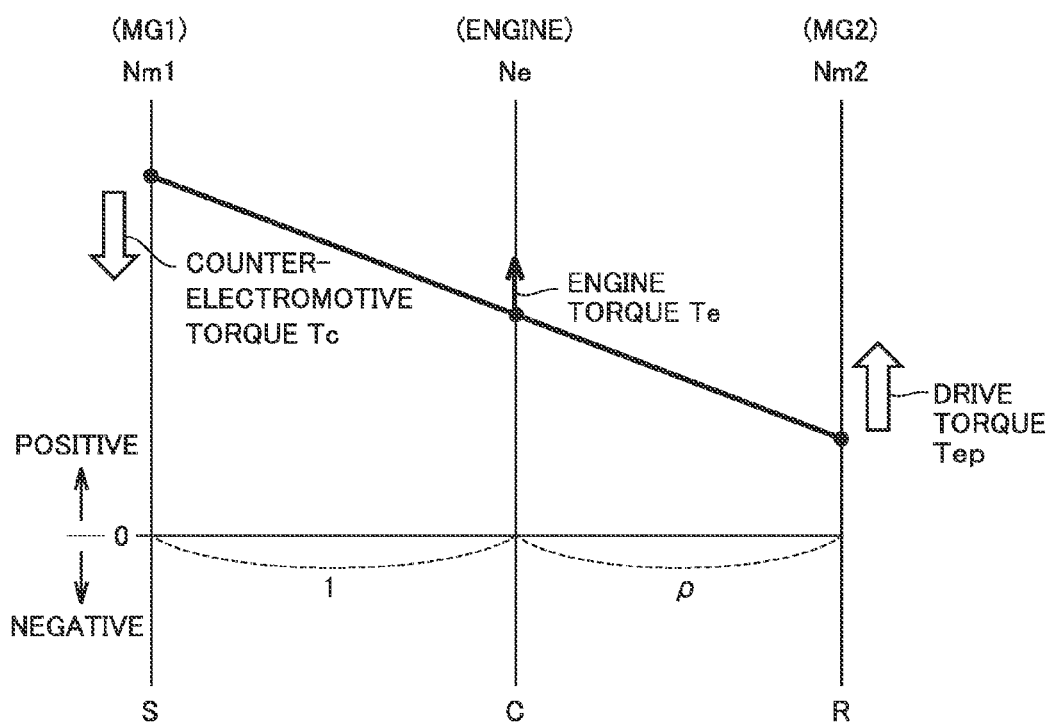
FIG. 5 is a diagram showing one example of a state of control during inverterless running in a nomographic chart.

FIG. 5 is a diagram showing one example of a state of control of engine 100 and motor-generators 10 and 20 during inverterless running in a nomographic chart of planetary gear mechanism 30. As described above, a rotation speed of sun gear S(=MG1 rotation speed Nm1), a rotation speed of carrier CA (=engine rotation speed Ne), and a rotation speed of ring gear R (=MG2 rotation speed Nm2) have such relation as being connected with a straight line in a nomographic chart (relation in a nomographic chart).

During inverterless running, engine torque Te is output from engine 100. When motor-generator 10 dynamically rotates with engine torque Te, motor-generator 10 generates counter-electromotive voltage Vc. When counter-electromotive voltage Vc exceeds system voltage VH, motor-generator 10 generates counter-electromotive torque Tc applied in a direction interfering rotation of motor-generator 10 (negative direction).

As counter-electromotive torque Tc is applied from motor-generator 10 to sun gear S, drive torque Tep applied in a positive direction (a forward direction) is generated in ring gear R as reaction force of counter-electromotive torque Tc. Vehicle 1 runs with the limp home function with drive torque Tep.

Since motor-generator 20 rotates with drive torque Tep, a counter-electromotive voltage is generated also in motor-generator 20. In the example shown in FIG. 5, however, MG2 rotation speed Nm2 has lowered to a rotation speed at which a counter-electromotive voltage of motor-generator 20 does not exceed system voltage VH. Therefore, counter-electromotive torque is not generated in motor-generator 20.

<Calculation of MG1 Rotation Speed Nm1 During Inverterless Running>

During inverterless running described above, MG1 rotation speed Nm1 is adjusted by controlling an output from engine 100 such that counter-electromotive torque Tc of motor-generator 10 attains to torque meeting user's requirements. During inverterless running control, secondary failure due to overheating of motor-generator 10 or overrevolution of planetary gear mechanism 30 should be prevented by suppressing MG1 rotation speed Nm1 to be within a predetermined rotation speed region.

During inverterless running control, however, for example, such an abnormal condition that ECU 300 cannot obtain output values from resolver 421 configured to detect MG1 rotation speed Nm1 and from resolver 422 configured to detect MG2 rotation speed Nm2 (in the description below, denoted as a resolver abnormal condition) may occur. When such an abnormal condition occurs, ECU 300 cannot know MG1 rotation speed Nm1, and hence MG1 rotation speed Nm1 may not be suppressed to be within the predetermined rotation speed region.

ECU 300 according to one or more embodiments calculates MG1 rotation speed Nm1 with a technique below when a resolver abnormal condition occurs during inverterless running.

In vehicle 1 described above, engine 100, motor-generator 10, and output shaft 60 (drive wheel 50 and motor-generator 20) are mechanically coupled to one another by planetary gear mechanism 30. Therefore, even when a resolver abnormal condition occurs, MG1 rotation speed Nm1 can accurately be calculated based on an output value from engine rotation speed sensor 410 (engine rotation speed Ne) and an output value from wheel speed sensor 73 (wheel speed VS) by making use of relation in a nomographic chart of planetary gear mechanism 30.

Though wheel speed sensor 73 can detect magnitude (an absolute value) of a rotation speed of drive wheel 50, it cannot detect a direction of rotation of drive wheel 50. With the technique making use of relation in a nomographic chart, two values, that is, a value at the time when drive wheel 50 is assumed to rotate forward (in a positive direction) and a value at the time when drive wheel 50 is assumed to rotate rearward (in a negative direction), are assumed as MG1 rotation speed Nm1. Therefore, which value is actual MG1 rotation speed Nm1 cannot be specified.

In view of the above, in one or more embodiments, ECU 300 operates as follows. When a resolver abnormal condition occurs during inverterless running, ECU 300 initially calculates a first estimated value Nm1 (VS+) and a second estimated value Nm1 (VS−) by making use of relation in a nomographic chart. First estimated value Nm1 (VS+) is an estimated value of an MG1 rotation speed at the time when drive wheel 50 is assumed to rotate forward (in a positive direction). Second estimated value Nm1 (VS−) is an estimated value of an MG1 rotation speed at the time when drive wheel 50 is assumed to rotate rearward (in a negative direction). ECU 300 calculates first estimated value Nm1 (VS+) and second estimated value Nm1 (VS−) by using an output value from engine rotation speed sensor 410 and an output value from wheel speed sensor 73. Then, ECU 300 controls a rotation speed of engine 100 such that both of first estimated value Nm1 (VS+) and second estimated value Nm1 (VS−) are within the predetermined rotation speed region. The predetermined rotation speed region is a rotation speed region between an upper limit value A and a lower limit value B (see FIG. 8) with upper limit value A and lower limit value B being defined as boundary values. In one or more embodiments, upper limit value A is greater than lower limit value B.

Thus, MG1 rotation speed Nm1 being out of the predetermined rotation speed region during inverterless running can reliably be suppressed. Therefore, secondary failure due to overheating of motor-generator 10 or overrevolution of planetary gear mechanism 30 can be suppressed.

Figure 6:
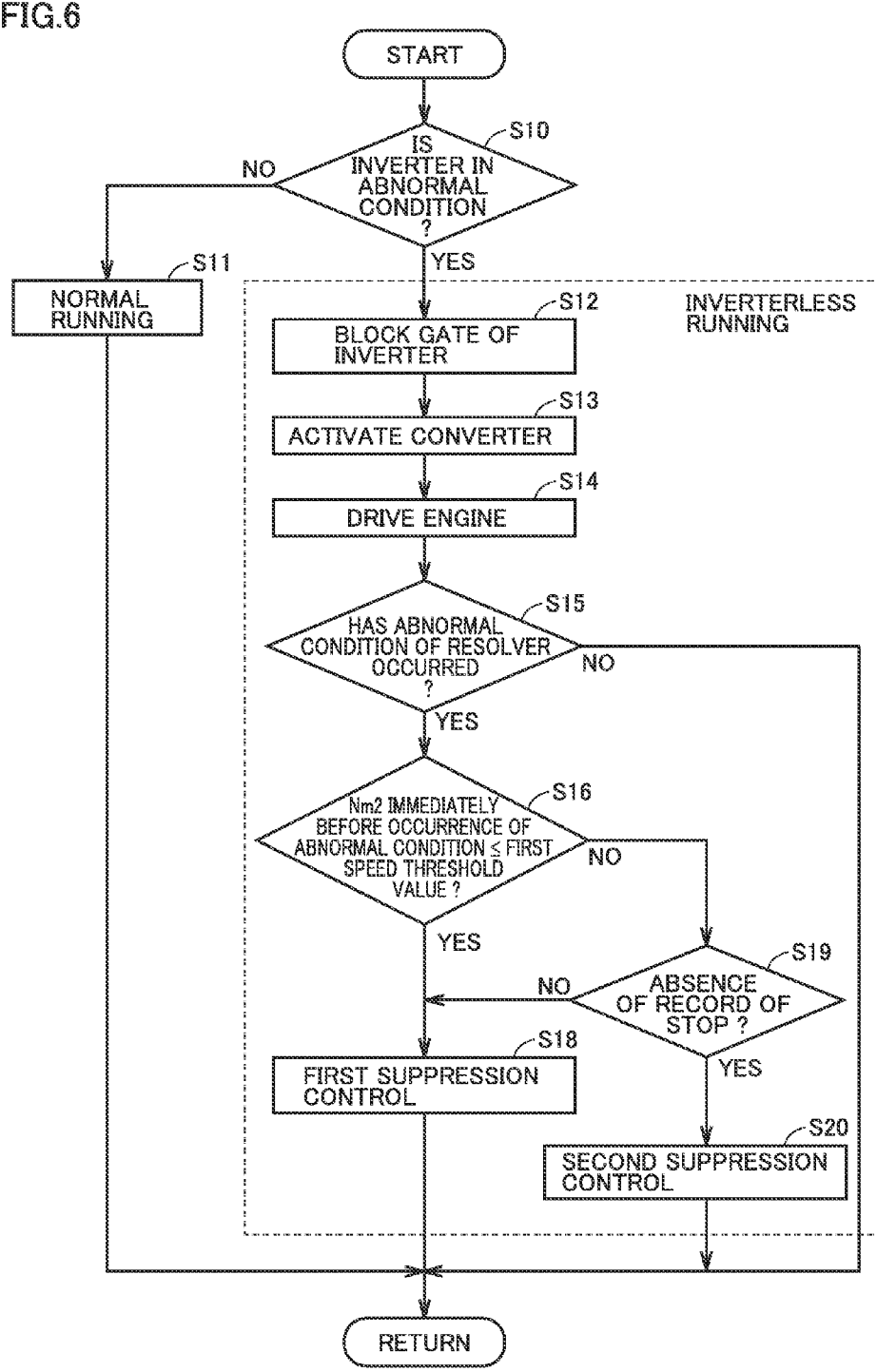
FIG. 6 is a flowchart showing a procedure of processing by an ECU.

FIG. 6 is a flowchart showing a procedure of processing when ECU 300 carries out inverterless running control. This flowchart is repeatedly executed in a prescribed cycle.

In a step (hereinafter a step being abbreviated as "S") 10, ECU 300 determines whether or not an abnormal condition of the inverter described above has occurred. When it is determined that the abnormal condition of the inverter has occurred (YES in S10), ECU 300 sets the control mode to the limp home mode and carries out inverterless running in S12 to S20. When it is determined that no abnormal condition of the inverter has occurred (NO in S10), the process proceeds to S11. In S11, ECU 300 sets the control mode to the normal mode and carries out normal running.

In S12, ECU 300 sets inverters 221 and 222 to the gate blocking state. In S13, ECU 300 controls converter 210 such that system voltage VH attains to a target system voltage VHtag. In one or more embodiments, target system voltage VHtag can be set, for example, to a predetermined fixed value.

In S14, ECU 300 drives engine 100. ECU 300 has counter-electromotive torque Tc generated from motor-generator 10 by driving engine 100 to mechanically rotate motor-generator 10. By controlling an output from engine 100, MG1 rotation speed Nm1 is adjusted such that counter-electromotive torque Tc of motor-generator 10 attains to torque meeting the user's requirements. Thus, inverterless running (running with the limp home function) is carried out with drive torque Tep applied to output shaft 60 as reaction force of counter-electromotive torque Tc.

In S15, ECU 300 determines whether or not a resolver abnormal condition has occurred. When ECU 300 cannot obtain output values of MG1 rotation speed Nm1 and MG2 rotation speed Nm2 from resolvers 421 and 422, ECU 300 determines that a resolver abnormal condition has occurred.

Failure in obtaining output values from resolver 421 and resolver 422 includes, for example, output values from resolver 421 and resolver 422 both being values which cannot normally be taken or being clearly erroneous, or failure in reception of output values themselves from resolver 421 and resolver 422 due to an abnormal condition (for example, incapability to communicate) through a communication path from resolver 421 and resolver 422 to ECU 300, or detection of a break in an internal circuit of resolver 421 and resolver 422, or a degree of similarity being lower than a threshold value (for example, difference in amplitude or phase being equal to or higher than a predetermined value) based on comparison of waveforms of outputs from resolver 421 and resolver 422 with a predetermined waveform.

When it is determined that a resolver abnormal condition has occurred (YES in S15), the process proceeds to S16. The process ends otherwise (NO in S15).

In S16, ECU 300 determines whether or not MG2 rotation speed Nm2 immediately before occurrence of the resolver abnormal condition is equal to or smaller than a first speed threshold value for starting first suppression control which will be described later. The first speed threshold value is a value for determining whether or not vehicle 1 immediately before occurrence of an abnormal condition is in a stopped state, and it may be, for example, zero or a predetermined value in consideration of a detection error of resolver 422.

ECU 300 holds MG2 rotation speed Nm2 obtained from resolver 422, for example, in a buffer. When ECU 300 determines that a resolver abnormal condition has occurred, ECU 300 specifies a direction of rotation (a sign of an output value) of the MG2 rotation speed immediately before the time point of determination and has the direction of rotation stored in the memory. ECU 300 determines whether or not the stored value is equal to or smaller than the first speed threshold value.

When it is determined that MG2 rotation speed Nm2 immediately before occurrence of the resolver abnormal condition is equal to or smaller than the first speed threshold value (YES in S16), the process proceeds to S18. The process proceeds to S19 otherwise (NO in S16).

In S18, ECU 300 carries out first suppression control. Details of first suppression control will be described later. In S19, ECU 300 determines whether or not there is a record of stop. ECU 300 determines whether or not there is a record of stop, for example, based on a state of a record flag indicating presence or absence of a record of stop. For example, the record flag is set to off when inverterless running is started. ECU 300 determines whether or not magnitude of an estimated value of MG2 rotation speed Nm2 based on a result of detection by wheel speed sensor 73 is equal to or smaller than a second speed threshold value. The second speed threshold value is a value for determining whether or not the vehicle is in the stopped state, and for example, it may be zero or a predetermined value in consideration of a detection error of wheel speed sensor 73. When ECU 300 determines that magnitude of the estimated value of MG2 rotation speed Nm2 based on a result of detection by wheel speed sensor 73 is equal to or smaller than the second speed threshold value, it sets the record flag to on. When the record flag is on, ECU 300 determines that there is a record of stop. When it is determined that there is a record of stop (YES in S19), the process proceeds to S20. The process proceeds to S18 otherwise (NO in S19).

In S20, ECU 300 carries out second suppression control. Details of second suppression control will be described later.

Figure 7:
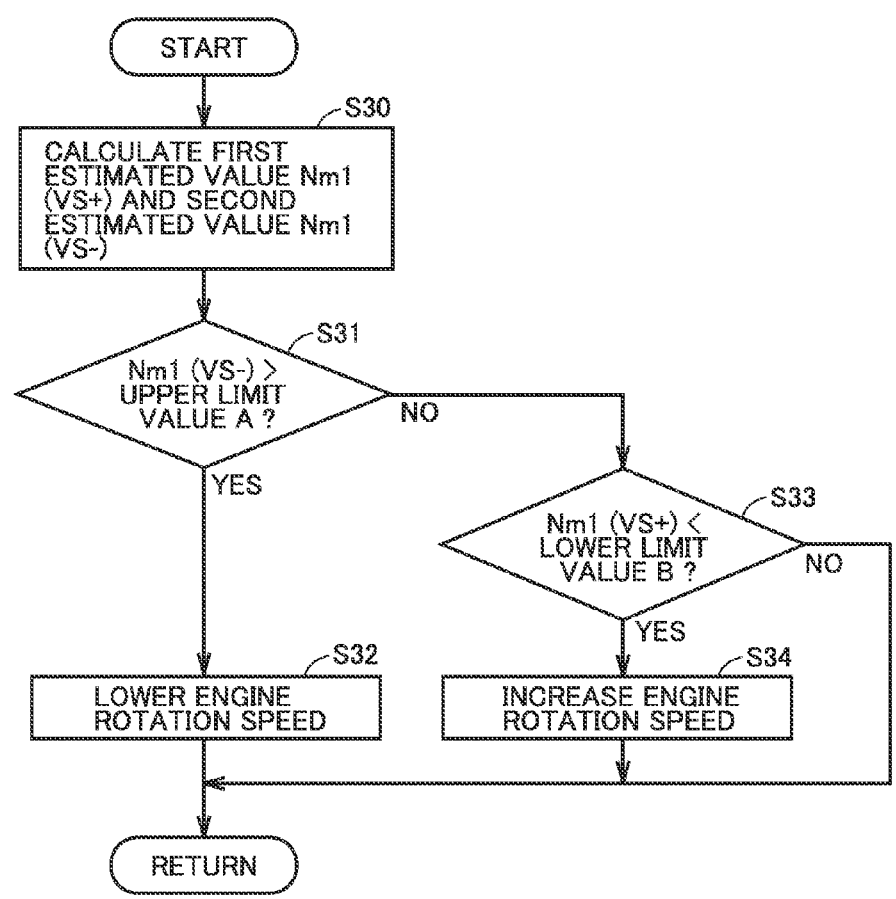
FIG. 7 is a flowchart showing a procedure of processing in first suppression control.

FIG. 7 is a flowchart showing a procedure of processing when ECU 300 carries out first suppression control. This flowchart shows what is done in first suppression control in S18 in FIG. 6.

In S30, ECU 300 calculates first estimated value Nm1 (VS+) and second estimated value Nm1 (VS−) described above.

Figure 8:
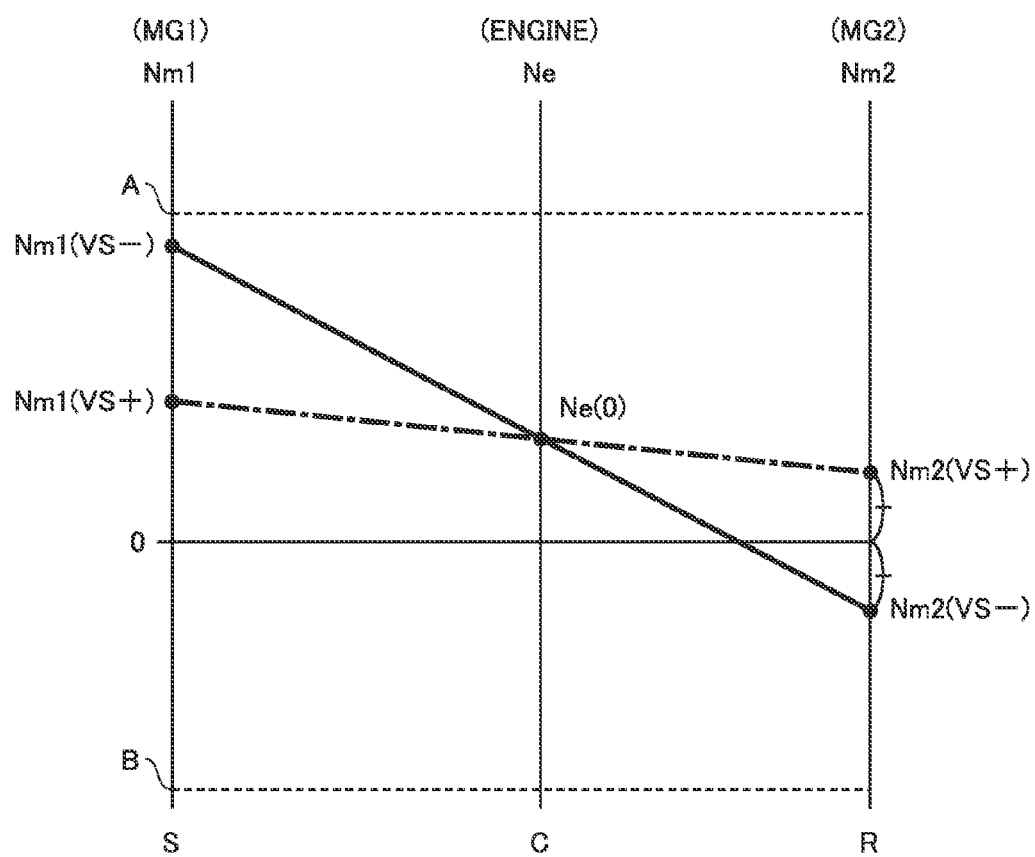
FIG. 8 is a diagram for illustrating a method of calculating a first estimated value Nm1 (VS+) and a second estimated value Nm1 (VS−) of the MG1 rotation speed by the ECU.

FIG. 8 is a diagram for illustrating a technique for calculation of first estimated value Nm1 (VS+) and second estimated value Nm1 (VS−) by ECU 300. Initially, ECU 300 calculates estimated value Nm2 (VS+) of an MG2 rotation speed at the time when drive wheel 50 is assumed to rotate forward and estimated value Nm2 (VS−) of an MG2 rotation speed at the time when drive wheel 50 is assumed to rotate rearward based on an output value from wheel speed sensor 73 (wheel speed VS). Estimated value Nm2 (VS+) and estimated value Nm2 (VS−) are equal to each other in absolute value and reverse in sign (Nm2 (VS+)>0 and Nm2 (VS−)<0).

ECU 300 further calculates first estimated value Nm1 (VS+) described above based on engine rotation speed Ne and estimated value Nm2 (VS+) by making use of relation in a nomographic chart (see a chain dotted line in FIG. 8). Similarly, ECU 300 calculates second estimated value Nm1 (VS−) described above based on engine rotation speed Ne and estimated value Nm2 (VS−) by making use of relation in a nomographic chart (see a solid line in FIG. 8). As exemplified in FIG. 8, first estimated value Nm1 (VS+) and second estimated value Nm1 (VS−) are different from each other, and which value is actual MG1 rotation speed Nm1 cannot be specified. Therefore, ECU 300 controls a rotation speed of engine 100 such that first estimated value Nm1 (VS+) and second estimated value Nm1 (VS−) do not exceed upper limit value A and lower limit value B of the predetermined rotation speed region in first suppression control.

Referring back to FIG. 7, in S31, ECU 300 determines whether or not calculated second estimated value Nm1 (VS−) is greater than upper limit value A. When it is determined that second estimated value Nm1 (VS−) is greater than upper limit value A (YES in S31), the process proceeds to S32. The process proceeds to S33 otherwise (NO in S31).

In S32, ECU 300 lowers engine rotation speed Ne. ECU 300 may lower engine rotation speed Ne, for example, by decreasing an amount of injection of fuel or by carrying out fuel cut control. ECU 300 may set engine 100 to a fuel cut state by setting SMR 160 to the disconnected state. For example, ECU 300 may set engine rotation speed Ne at which second estimated value Nm1 (VS−) is equal to or smaller than upper limit value A as a target value and may control engine rotation speed Ne so as to be equal to or smaller than the set target value.

In S33, ECU 300 determines whether or not calculated first estimated value Nm1 (VS+) is smaller than lower limit value B. When it is determined that first estimated value Nm1 (VS+) is smaller than lower limit value B (YES in S33), the process proceeds to S34. The process ends otherwise (NO in S33).

In S34, ECU 300 increases engine rotation speed Ne. ECU 300 may increase engine rotation speed Ne, for example, by increasing an amount of injection of fuel. ECU 300 may set engine rotation speed Ne at which first estimated value Nm1 (VS+) is equal to or greater than lower limit value B as a target value and may control engine rotation speed Ne so as to be equal to or greater than the set target value.

Figure 9:
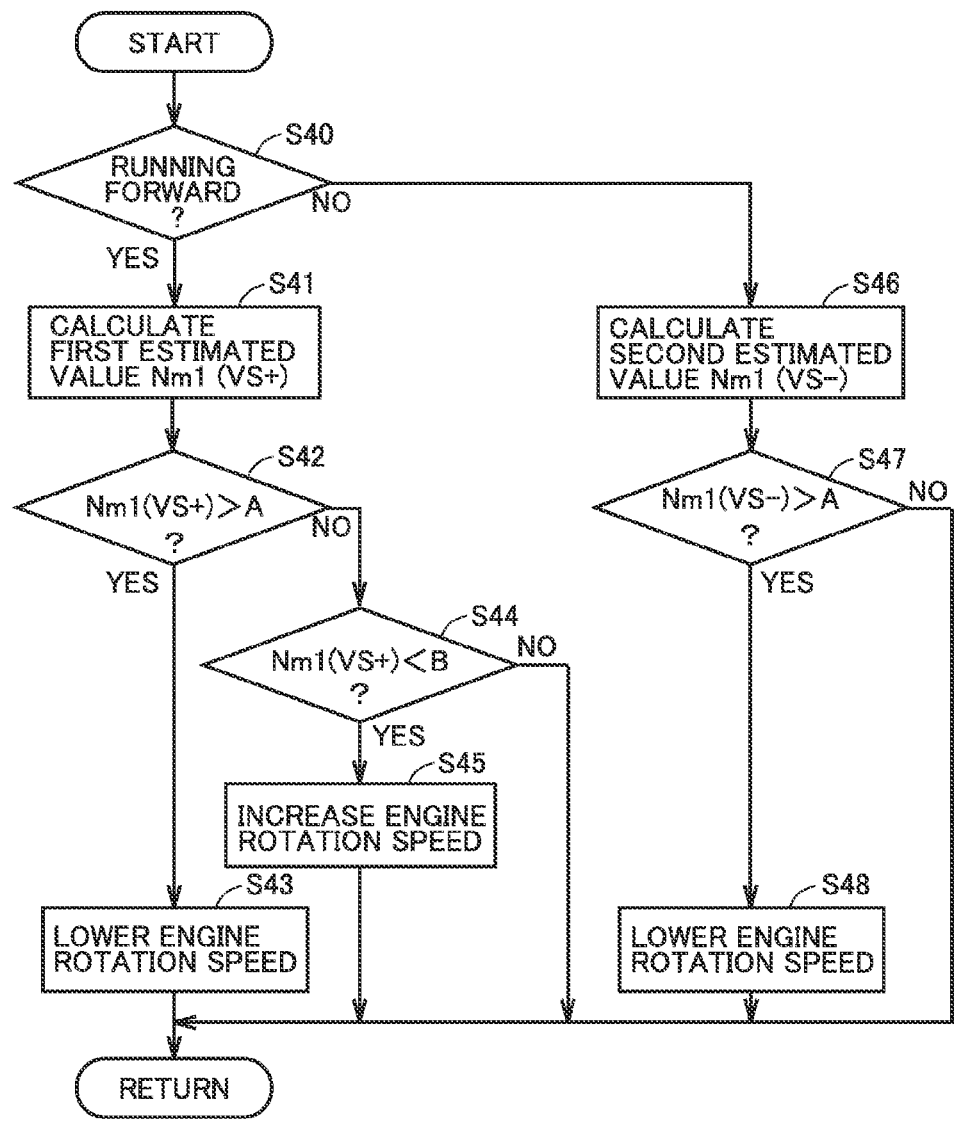
FIG. 9 is a flowchart showing a procedure of processing in second suppression control.

FIG. 9 is a flowchart showing a procedure in processing when ECU 300 carries out second suppression control. This flowchart shows what is done in second suppression control in S20 in FIG. 6.

In S40, ECU 300 determines whether or not vehicle 1 is running forward. ECU 300 determines whether or not vehicle 1 is running forward, for example, based on a sign of an output value from resolver 422 immediately before occurrence of a resolver abnormal condition. When the sign of the output value from resolver 422 is the sign indicating forward running (for example, plus), ECU 300 determines that vehicle 1 is running forward. For example, when a sign of an output value from resolver 422 is the sign (for example, minus) different from the sign indicating forward running, ECU 300 determines that vehicle 1 is running rearward (that is, is not running forward). When it is determined that vehicle 1 is running forward (YES in S40), the process proceeds to S41. The process proceeds to S46 otherwise (NO in S40).

In S41, ECU 300 calculates first estimated value Nm1 (VS+). Since a method of calculating first estimated value Nm1 (VS+) is as described above, detailed description thereof will not be repeated.

In S42, ECU 300 determines whether or not first estimated value Nm1 (VS+) is greater than upper limit value A. When it is determined that first estimated value Nm1 (VS+) is greater than upper limit value A (YES in S42), the process proceeds to S43. The process proceeds to S44 otherwise (NO in S42).

In S43, ECU 300 lowers engine rotation speed Ne. Since the method of lowering engine rotation speed Ne is as described in connection with S32 in FIG. 7 described above, detailed description thereof will not be repeated.

In S44, ECU 300 determines whether or not first estimated value Nm1 (VS+) is smaller than lower limit value B. When it is determined that first estimated value Nm1 (VS+) is smaller than lower limit value B (YES in S44), the process proceeds to S45. The process ends otherwise (NO in S44).

In S45, ECU 300 increases engine rotation speed Ne. ECU 300 may increase engine rotation speed Ne, for example, by increasing an amount of injection of fuel.

In S46, ECU 300 calculates second estimated value Nm1 (VS−). Since a method of calculating second estimated value Nm1 (VS−) is as described in connection with S30 in FIG. 7 described above, detailed description thereof will not be repeated.

In S47, ECU 300 determines whether or not second estimated value Nm1 (VS−) is greater than upper limit value A. When it is determined that second estimated value Nm1 (VS−) is greater than upper limit value A (YES in S47), the process proceeds to S48. The process ends otherwise (NO in S47). In S48, ECU 300 lowers engine rotation speed Ne.

An operation of ECU 300 mounted on vehicle 1 according to one or more embodiments based on the structure and the flowchart as above will be described.

When inverters 221 and 222 can normally be controlled (NO in S10), normal running is carried out (S11). When inverters 221 and 222 cannot normally be controlled due to a resolver abnormal condition, it is determined that an abnormal condition of the inverter has occurred (YES in S10) and inverterless running is started.

During inverterless running, inverters 221 and 222 are set to the gate blocking state (S12), converter 210 is activated (S13), and engine 100 is driven (S14).

When the resolver abnormal condition has occurred (YES in S15) and MG rotation speed Nm2 immediately before occurrence of the abnormal condition is equal to or smaller than the first speed threshold value (YES in S16) due to the fact that vehicle 1 is in the stop state, first suppression control is carried out (S18). Alternatively, when MG rotation speed Nm2 immediately before occurrence of the abnormal condition is greater than the first speed threshold value (NO in S16) due to the fact that vehicle 1 is in a running state and when there is a record of stop after start of inverterless running (NO in S19), first suppression control is carried out (S18).

When first suppression control is carried out, first estimated value Nm1 (VS+) and second estimated value Nm1 (VS−) are calculated (S30). When second estimated value Nm1 (VS−) is greater than upper limit value A (YES in S31) as a result of increase in vehicle speed due to resumption of running of vehicle 1 which has been in the stopped state, engine rotation speed Ne is lowered (S32). As engine rotation speed Ne is lowered, MG1 rotation speed Nm1 is lowered. Therefore, second estimated value Nm1 (VS−) can be controlled to upper limit value A or smaller.

When first estimated value Nm1 (VS+) is smaller than lower limit value B (YES in S33), engine rotation speed Ne is increased (S34). As engine rotation speed Ne increases, MG1 rotation speed Nm1 increases. Therefore, first estimated value Nm1 (VS+) can be controlled to lower limit value B or greater.

When a resolver abnormal condition has occurred (YES in S15) and vehicle 1 is running forward and when MG rotation speed Nm2 immediately before occurrence of the abnormal condition is greater than the first speed threshold value (NO in S16), second suppression control is carried out (S20) unless there is a record of stop after start of inverterless running (YES in S19).

As second suppression control is carried out, first estimated value Nm1 (VS+) is calculated (S41) because vehicle 1 is running forward (YES in S40). When calculated first estimated value Nm1 (VS+) is greater than upper limit value A (YES in S42), engine rotation speed Ne is lowered (S43). As engine rotation speed Ne is lowered, MG1 rotation speed Nm1 is lowered. Therefore, first estimated value Nm1 (VS+) can be controlled to upper limit value A or smaller.

When calculated first estimated value Nm1 (VS+) is smaller than lower limit value B (YES in S44), engine rotation speed Ne is increased (S45). As engine rotation speed Ne increases, MG1 rotation speed Nm1 increases. Therefore, first estimated value Nm1 (VS+) can be controlled to lower limit value B or greater.

When vehicle 1 is running rearward (NO in S40), second estimated value Nm1 (VS−) is calculated (S46). When calculated second estimated value Nm1 (VS−) is greater than upper limit value A (YES in S47), engine rotation speed Ne is lowered (S48). As engine rotation speed Ne is lowered, MG1 rotation speed Nm1 is lowered. Therefore, second estimated value Nm1 (VS−) can be controlled to upper limit value A or smaller.

As set forth above, according to vehicle 1 according to one or more embodiments, when a resolver abnormal condition occurs during inverterless running control and when there is a record of stop, it becomes difficult to specify whether vehicle 1 runs forward or rearward and hence first suppression control is carried out. Engine rotation speed Ne is controlled such that both of first estimated value Nm1 (VS+) and second estimated value Nm1 (VS−) are within a predetermined rotation speed region defined by upper limit value A and lower limit value B in first suppression control. Thus, overspeed rotation of motor-generator 10 can be suppressed. Therefore, a hybrid vehicle in which overspeed rotation of motor-generator 10 can be suppressed during inverterless running control can be provided.

When there is no record of stop, second suppression control is carried out. In second suppression control, whether vehicle 1 runs forward or rearward can be specified based on a sign of an output value from resolver 422 immediately before occurrence of a resolver abnormal condition. Therefore, engine rotation speed Ne is controlled such that an estimated value of an MG1 rotation speed corresponding to a sign of an output value from resolver 422 immediately before failure in obtaining an output value (any of first estimated value Nm1 (VS+) and second estimated value Nm1 (VS−)) is within the predetermined rotation speed region defined by upper limit value A and lower limit value B. Thus, overspeed rotation of motor-generator 10 can be suppressed. In particular, since a direction of travel of vehicle 1 can be specified, a degree of restriction of a speed of the vehicle can be relaxed as compared with when first suppression control is carried out.

A modification will be described below.

In the embodiments described above, first suppression control and second suppression control have been described as engine rotation speed Ne being lowered when an estimated value of an MG1 rotation speed exceeds upper limit value A. For example, engine 100 may be controlled such that an amount of increase in estimated value Nm1 (VS+) of an MG1 rotation speed is smaller as the estimated value of the MG1 rotation speed is closer to upper limit value A. Thus, the estimated value of the MG1 rotation speed can be prevented from exceeding upper limit value A.

In the embodiments described above, when a resolver abnormal condition occurs during inverterless finning, any of first suppression control and second suppression control is carried out depending on presence or absence of a record of stop. For example, when a resolver abnormal condition occurs during inverterless running, first suppression control may be carried out regardless of presence or absence of a record of stop. By doing so as well, overspeed rotation of motor-generator 10 can be suppressed during inverterless running control.

Figure 10:
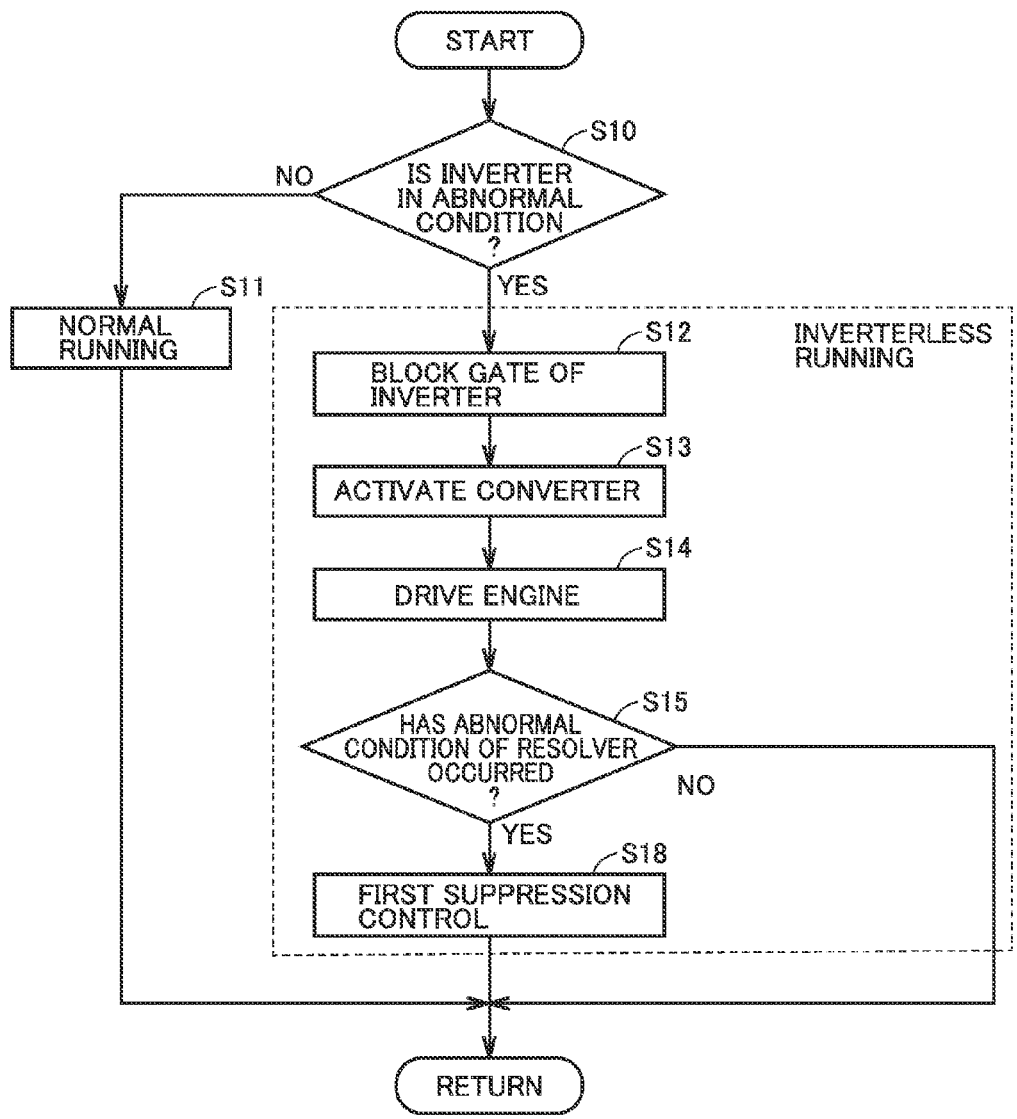
FIG. 10 is a flowchart showing a procedure of processing by the ECU according to a modification.

For example, as shown in FIG. 10, when ECU 300 determines in S15 that a resolver abnormal condition has occurred (YES in S15), it may carry out first suppression control in S18. Since other processing in FIG. 10 is as described with reference to FIG. 6, detailed description thereof will not be repeated.

In the embodiments described above, first suppression control has been described as lowering or increase in engine rotation speed Ne when any one estimated value of first estimated value Nm1 (VS+) and second estimated value Nm1 (VS−) is out of the predetermined rotation speed region. When the other estimated value is out of the predetermined rotation speed region by lowering or increase in engine rotation speed Ne, however, a vehicle speed may be lowered, for example, by activating a braking apparatus.

The modification above may be carried out by combining the entirety or a part thereof.

Though embodiments of the present disclosure have been described, it should be understood that embodiments disclosed herein are illustrative and non-restrictive in every respect. The scope of the present subject matter is defined by the terms of the claims and is intended to include any modifications within the scope and meaning equivalent to the terms of the claims.

What is claimed is:

1. A hybrid vehicle comprising:
an engine;
a first rotating electric machine including a permanent magnet in a rotor;
an output shaft connected to a wheel;
a planetary gear mechanism including a carrier coupled to the engine, a sun gear coupled to the first rotating electric machine, and a ring gear coupled to the output shaft;
a second rotating electric machine connected to the output shaft;
a battery;
an inverter configured to convert power among the battery, the first rotating electric machine, and the second rotating electric machine;
a first sensor configured to detect a rotation speed and a direction of rotation of the first rotating electric machine;
a second sensor configured to detect a rotation speed and a direction of rotation of the second rotating electric machine;
an engine rotation speed sensor configured to detect a rotation speed of the engine;
a wheel speed sensor configured to detect a rotation speed of the wheel, the wheel speed sensor being unable to detect a direction of rotation of the wheel; and
a controller configured to carry out inverterless running control when the first rotating electric machine and the second rotating electric machine cannot normally be driven by the inverter,
the inverterless running control being control in which the inverter is set to a gate blocking state, the engine is driven to generate in the first rotating electric machine, braking torque originating from a counter-electromotive voltage, and a vehicle runs with torque applied to the output shaft as reaction force of the braking torque, and
when the controller cannot obtain output values from the first sensor and the second sensor during the inverterless running control, the controller being configured to:
calculate (i) a first estimated value of a rotation speed of the first rotating electric machine when the wheel is assumed to rotate forward and (ii) a second estimated value of a rotation speed of the first rotating electric machine when the wheel is assumed to rotate rearward, by using an output value from the engine rotation speed sensor and an output value from the wheel speed sensor; and
control the rotation speed of the engine such that both of the first estimated value and the second estimated value are within a predetermined rotation speed region.

2. The hybrid vehicle according to claim 1, wherein
when the control device cannot obtain the output values from the first sensor and the second sensor during the inverterless running control, the controller is configured to:
control the rotation speed of the engine such that one of the first estimated value and the second estimated value having the same sign as an output value from the second sensor immediately before an output value from the second sensor cannot be obtained is within the predetermined rotation speed region when there is no stop record of the vehicle in which the output value from the wheel speed sensor attains to a value indicating a stop state during the inverterless running control, and
control the rotation speed of the engine such that both of the first estimated value and the second estimated value are within the predetermined rotation speed region when there is a stop record of the vehicle.

3. A method for controlling a hybrid vehicle, the hybrid vehicle including: an engine; a first rotating electric machine including a permanent magnet in a rotor; an output shaft connected to a wheel; a planetary gear mechanism including a carrier coupled to the engine, a sun gear coupled to the first rotating electric machine, and a ring gear coupled to the output shaft; a second rotating electric machine connected to the output shaft; a battery; an inverter configured to convert power among the battery, the first rotating electric machine, and the second rotating electric machine; a first sensor configured to detect a rotation speed and a direction of rotation of the first rotating electric machine; a second sensor configured to detect a rotation speed and a direction of rotation of the second rotating electric machine; an engine rotation speed sensor configured to detect a rotation speed of the engine; and a wheel speed sensor configured to detect a rotation speed of the wheel, the wheel speed sensor being unable to detect a direction of rotation of the wheel, the method comprising:
carrying out inverterless running control when the first rotating electric machine and the second rotating electric machine cannot normally be driven by the inverter;
calculating (i) a first estimated value of a rotation speed of the first rotating electric machine when the wheel is assumed to rotate forward and (ii) a second estimated value of a rotation speed of the first rotating electric machine when the wheel is assumed to rotate rearward, by using an output value from the engine rotation speed sensor and an output value from the wheel speed sensor when output values from the first sensor and the second sensor cannot be obtained during the inverterless running control, and controlling the rotation speed of the engine such that both of the first estimated value and the second estimated value are within a predetermined rotation speed region, the inverterless running control being control in which the inverter is set to a gate blocking state, the engine is driven to generate in the first rotating electric machine, braking torque originating from a counter-electromotive voltage, and a vehicle runs with torque applied to the output shaft as reaction force of the braking torque.

4. The method for controlling a hybrid vehicle according to claim 3, the method further comprising:

when the output values from the first sensor and the second sensor cannot be obtained during the inverterless running control, controlling the rotation speed of the engine such that one of the first estimated value and the second estimated value having the same sign as an output value from the second sensor immediately before an output value from the second sensor cannot be obtained is within the predetermined rotation speed region when there is no stop record of the vehicle in which the output value from the wheel speed sensor attains to a value indicating a stop state during the inverterless running control; and controlling the rotation speed of the engine such that both of the first estimated value and the second estimated value are within the predetermined rotation speed region when there is a stop record of the vehicle.

* * * * *

UNITED STATES PATENT AND TRADEMARK OFFICE
CERTIFICATE OF CORRECTION

PATENT NO. : 9,975,418 B2  
APPLICATION NO. : 15/278356  
DATED : May 22, 2018  
INVENTOR(S) : Takashi Ando et al.

Page 1 of 1

It is certified that error appears in the above-identified patent and that said Letters Patent is hereby corrected as shown below:

In the Specification

In Column 14, Line 66, delete "finning" and insert --running--, therefor.

Signed and Sealed this  
Third Day of July, 2018

Andrei Iancu  
*Director of the United States Patent and Trademark Office*